United States Patent [19]

Chalupa

[11] Patent Number: 5,521,446
[45] Date of Patent: May 28, 1996

[54] LINEAR ELECTROMAGNETIC DRIVE MEANS

[75] Inventor: Antonin Chalupa, Vrchlabi, Czechoslovakia

[73] Assignee: Fluid Systems Partners SA, Luxembourg, Luxembourg

[21] Appl. No.: 217,690

[22] Filed: Mar. 24, 1994

[51] Int. Cl.$^6$ ................................................. H02K 41/00
[52] U.S. Cl. ................................ 310/12; 310/17; 318/135
[58] Field of Search ............................. 310/12, 13, 14, 310/15, 17, 23, 30; 318/135; 267/150, 154, 180

[56] References Cited

U.S. PATENT DOCUMENTS

| 2,426,745 | 9/1947 | Porskievies | 335/262 |
| 4,194,173 | 3/1980 | Loup et al. | 335/260 |
| 5,062,619 | 11/1991 | Sato | 267/154 |

*Primary Examiner*—Steven L. Stephan
*Assistant Examiner*—Judson H. Jones
*Attorney, Agent, or Firm*—Shenier & O'Connor

[57] ABSTRACT

A linear electromagnetic drive means comprises a coil with a controllable electric current flowing therethrough, magnetic poles assigned to the coil and an axially displaceable core biased by at least one spring in the region of the coil and the magnetic poles, whereby the core serves to control a control element by means of its displacement movement triggered by the electric current. The spring biasing the displaceable core has the design of a tube in which slits extending essentially radially are formed with flexible tube segments lying therebetween.

10 Claims, 2 Drawing Sheets

LINEAR ELECTROMAGNETIC DRIVE MEANS

The invention relates to a linear electromagnetic drive means having a coil with a controllable electric current flowing therethrough, magnetic poles assigned to the coil and an axially displaceable core biased by at least one spring in the region of the coil and the magnetic poles, whereby the core serves to control a control element by means of its displacement movement triggered by the electric current.

Known drive means of this type, also called linear electromechanical converters, serve in particular the purpose of operating hydraulic and pneumatic control and regulating elements, for example, slide valves and the like.

These drive means connect electrical/electronic control systems with hydraulic or pneumatic line systems to be controlled hereby. A broad utilization of such drive means was previously prevented by constructive as well as technical manufacturing problems. These problems concern particularly the mounting of the core or the armature with the aid of springs. The use of diaphragm springs or helical springs is known. Both springs often lack the required stability and precision, they cannot apply the required forces, they are prone to permanent deformation under overload as well to generating undesired radial forces acting on the core.

It is the object of the invention to remedy the described shortcomings and to design a drive means of the generic type such that the core of the drive means is securely fixed and biased by stable, precisely operating springs which are neither prone to permanent deformation nor to generating radial forces.

The object is accomplished in accordance with the invention in a a drive means of the generic type in that the spring biasing the displaceable core has the design of a tube in which slits extending essentially radially are formed with flexible tube segments lying therebetween.

The following description of preferred embodiments of the invention serve to explain the invention in greater detail in conjunction with the drawings.

Figure 1:
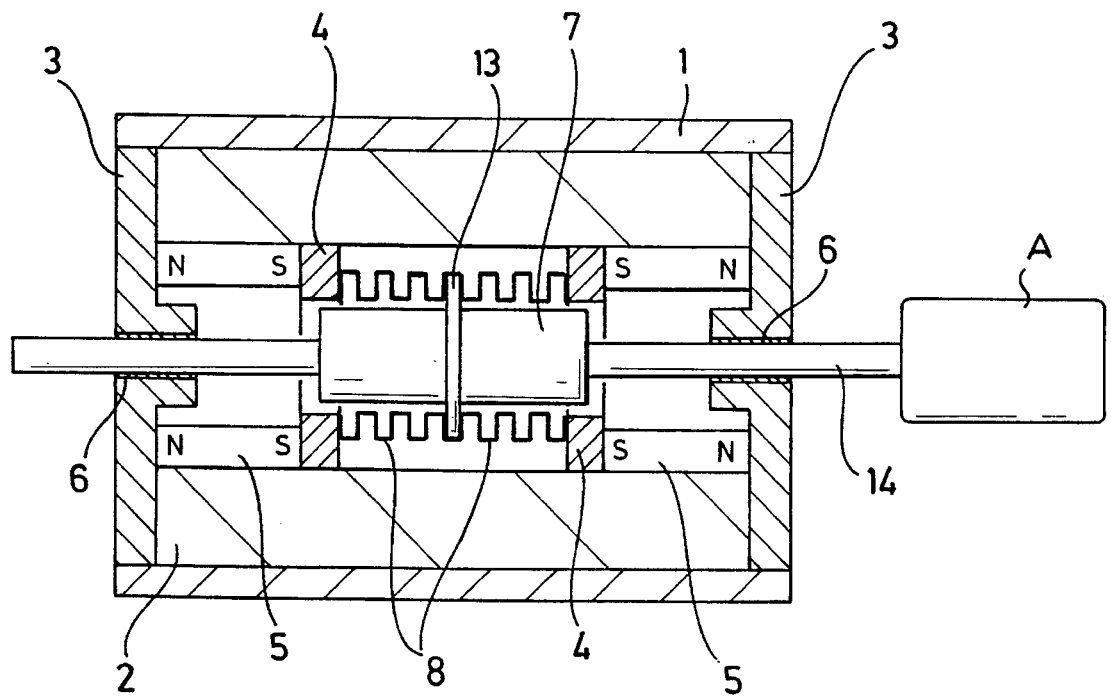
FIG. 1 shows schematically, an axial-sectional view of a linear electrical drive means.

In FIG. 1, a linear electrical drive means comprises a housing 1, in which a coil 2, two outer pole shoes 3 as end face cover as well as two inner pole shoes 4 are arranged. Oppositely polarized permanent magnets 5, their poles being designated with S or N, are located between the outer and inner pole shoes 3 or 4. An armature or core 7, for example, of massive soft iron, is guided so as to be axially displaceable in corresponding bearings 6 in the outer pole shoes 3 by means of a fixed axle 14. Housing 1 and core 7 are preferably designed so as to be circular-cylindrical. The coil 2 is connected to an electrical current source via electrical control elements, so that a controllable electric current flows therethrough, which exerts a force directed in the direction of the axle 14 on the armature or core 7 depending on the strength and direction of the current and by means of this force, the core is displaced axially in FIG. 1 to the left or to the right. A control element A, for example, a valve of a hydraulic or pneumatic line circuit, is connected with the axle 14 and is continuously displaceable by means of the displacement movement of the core 7 and hereby can exert constantly varying control functions.

A radially protruding collar 13 fixedly connected with the core is formed in the middle of this core. Springs 8—schematically indicated in FIG. 1—are arranged between the collar and the pole shoes 4 lying opposite each other on both sides and fixed with respect to the housing; these springs are supported, on the one hand, on the mentioned pole shoes 4 fixed with respect to the housing and, on the other hand, at one side of the collar 13 and hereby hold the core 7 in a central position. When corresponding control currents flow through the coil 2, the core 7 is axially displaced in the one or other direction against the action of the spring 8 biasing it and by means of which the mentioned control functions can be performed.

Figure 2:
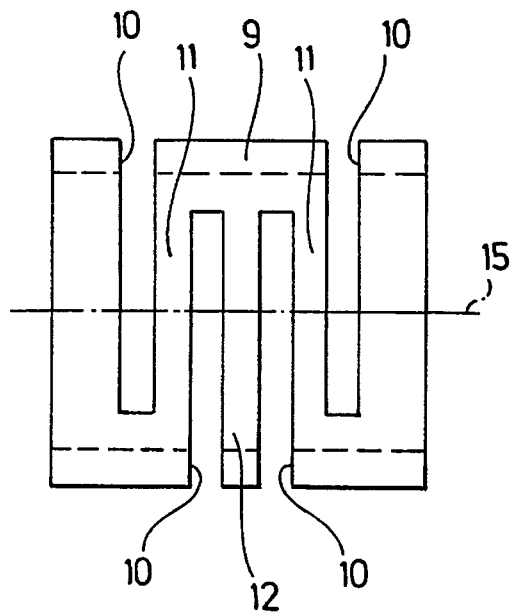
FIG. 2 shows schematically in axial section, a first embodiment of a tube-shaped spring according to the invention.

The design of the springs 8 is represented in FIG. 2. With respect to their manufacture, it is preferably proceeded from a circular-cylindrical tube 9 having a specific wall strength. Slits extending essentially radially from two opposite sides are introduced into the tube 9 from both sides, for example, by sawing or milling, these slits extending beyond the center axis 15 of the tube 9. Flexible tube segments 11, 12 remain between the slits 10. By means of the slits, the tube, as a whole, forms a spring which acts similarly to a helical spring and can be pressed together axially to a certain extent as a function of the widths of the slits 10 whereby, in contrast to a helical spring, minimal additional radial forces result which could have a disruptive effect on the core 7 which is arranged coaxially in the interior of the tube 9 acting as a spring. The spring formed from the tube 9 is, in addition, more stable and more precise than a normal helical spring and also withstands greater loads without permanently deforming.

The tube 9 from which the spring is formed by the insertion of the slits 10, consists of non- or anti-magnetic material, for example, stainless steel (fine steel) or of anti-magnetic alloys with corresponding elasticity.

A further advantage of the spring formed from the tube 9 is that it only requires a very small installation area in the interior of the linear electromagnetic drive means according to FIG. 1.

The deflection of the core 7 centered by the two tube-shaped springs 8 is proportional to the strength and direction of the control current flowing through the coil 2. With this, the rigidity of the spring 8 must naturally be greater than the force exerted by the magnetic circuit, since otherwise the core 7 could tilt over from one end position to the other. When the drive means is overloaded by electric current or an external force, then the special design of the spring 8 according to FIG. 2 prevents the core 7 from abutting on one of the outer pole shoes 3.

As is apparent from FIG. 2, two slits 10 are worked in pairs into the tube 9 forming the springs 8, from two different sides of the tube, whereby two pairs of flexible sections result which contain the segments 11. The measurements of the segments 11, which are not elastic per se, and thus also the rigidity of the spring, are given by the dimensioning of the tube 9 used, as well as the position and in particular the depth of the slits 10. In order to ensure minimal radial forces, the slits 10 ought to have the same width as well as depth. Also the segments 11 should each have an equal width.

In a special embodiment, a central slit 10 having a greater, for example, double width can result when omitting the segment 12 lying in the middle, in FIG. 2.

In every case, the correct selection of the constructional size of the spring 8, whereby the slits 10, in particular, are not allowed to be too wide, ensures that the maximum admissible strain under high load possibly leading to permanent deformation of the spring is also not exceeded when the individual segments 11 abut on each other with their respective outer ends.

The described spring construction can always be used where a constant force control, i.e. the displacement of a mechanical control element by means of electric current, is required.

Figure 3:
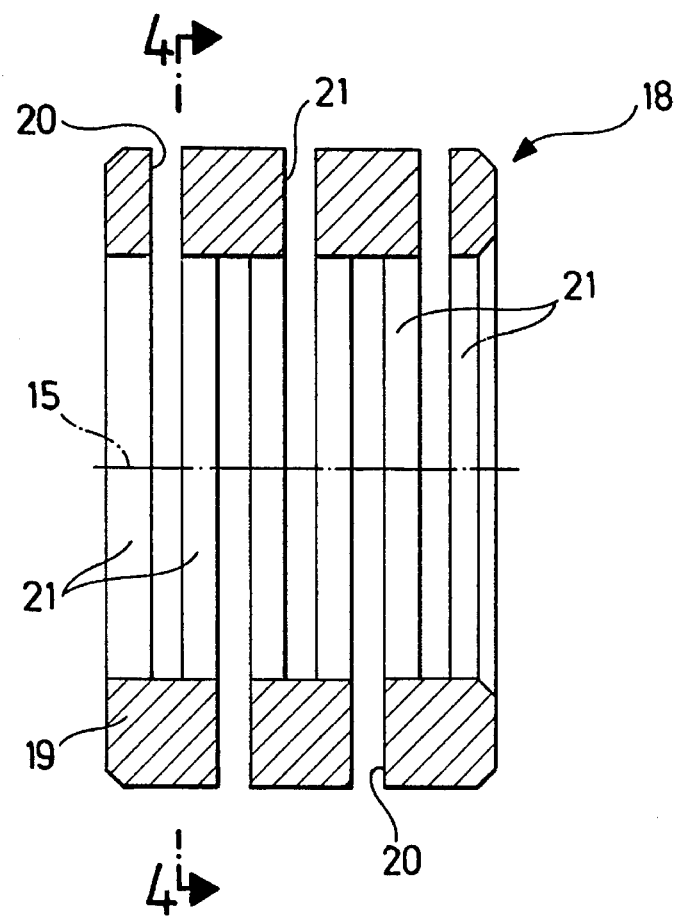
FIG. 3 shows another embodiment of a tube-shaped spring according to the invention and FIG. 4 shows a sectional view along the line IV—IV in FIG. 3.
Figure 4:
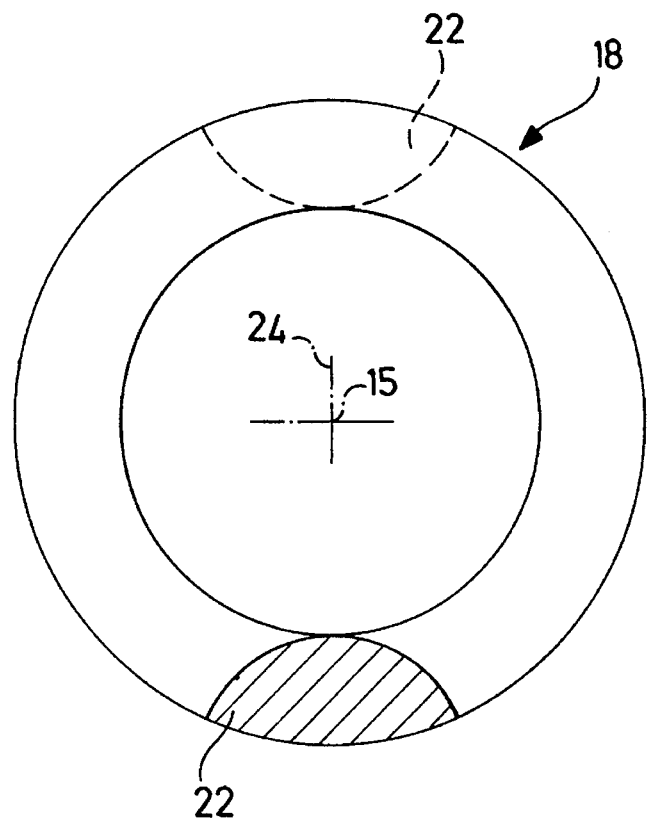

A further embodiment of a tube-shaped spring 18 is represented in FIGS. 3 and 4, in which the slits 20 extend from the sides of the tube 19 opposite each other, beyond the center axis 15 up to the respective opposite inner wall of the tube 19. Also in the embodiment according to FIGS. 3 and 4, the slits—and, moreover, also the segments 21 lying between them—essentially have the same width and depth. As is apparent from FIG. 4, the sections of the segments 21 lying in the region of the walls of the tube 19, have a design or shape limited on the inside and the outside by circular arcs.

As is apparent from FIGS. 3 and 4, the slits 20 in the tube 19 are designed such that the spring 18 has two planes of symmetry. The one plane of symmetry in FIG. 3 extends vertically to the plane of drawing and vertically to the center axis 15 in the middle of the central slit 21. The other plane of symmetry is at right angles to the plane of drawing of FIG. 4 and extends along the dash-dot line 24.

In the embodiment of the invention represented in FIG. 1, the core 7 is centered by two tube-shaped springs 8, each engaging at the collar 13. In another embodiment, the tube-shaped springs 8 can also each be arranged between an end face of the core 7 and one of the outer pole shoes 3. Is is also possible to design two ring-shaped collars corresponding with the collar 13 at the core 7 or at its axle 14 in the vicinity of the outer pole shoes 3 and to arrange the tube-shaped springs 8 between these collars, on the one hand, and, on the other hand, the parts of the means fixed with respect to the housing, for example, the inner pole shoes 4. Also in these embodiments, the core 7 is centered each time in the middle of the means. In a further modified embodiment of the invention, the use of a single tube-shaped spring 8 is sufficient which biases the core 7 only in one direction and, for example, holds it in contact with one of the outer pole shoes 3. The control current flowing through the coil 2 can then, as a rule, displace the core 7 only in one direction against the biasing force of the spring 8, unless a mean control current constantly flows through the coil 2 by means of which the core 7 is held in a central position so that a displacement of the core then results in both directions when the control current is decreased or increased.

I claim:

1. A linear drive device including in combination a linear electromagnetic actuator comprising a permeable housing, a permanent magnet, an excitable winding, a permeable cylindrical core having an axis, and means mounting the core for movement along its axis; and means comprising a first linear spring having a linear gradient for biasing the core toward a predetermined axial position, said spring comprising a hollow tube of predetermined wall thickness having an axis, the tube being provided with first and second axially spaced radial slits respectively extending in first and second opposite directions and providing therebetween a tube segment, the spring being disposed with its axis colinear with the core axis.

2. A device as in claim 1 wherein the biasing means includes a second linear spring having the same construction as the first linear spring.

3. A device as in claim 1 wherein each radial slit extends appreciably beyond the axis of the tube.

4. A device as in claim 1 in which each slit extends to the opposite wall of the tube, whereby the tube segment has a length equal to the inner diameter of the tube.

5. A device as in claim 1 wherein each slit has the same width and depth.

6. A device as in claim 1 wherein the tube is provided with a third axially spaced radial slit extending in said first direction and providing between the second and third slits a further tube segment, wherein the tube segments have substantially equal widths.

7. A device as in claim 1 wherein the slits are so disposed that the linear spring has two orthogonally disposed planes of symmetry each passing through its axis.

8. A device as in claim 6 wherein the first and third slits have substantially equal widths and the second slit is of appreciably greater width.

9. A device as in claim 2 wherein the core is provided with an annular collar disposed at a central axial position wherein the first spring extends from said collar in a first axial direction and the second spring extends from said collar in an opposite axial direction.

10. A device as in claim 1 wherein the linear spring is formed of a non-magnetic material.

* * * * *